(12) United States Patent
Correa et al.

(10) Patent No.: US 10,583,878 B2
(45) Date of Patent: Mar. 10, 2020

(54) ENDLESS TRACK FOR SUBMERSIBLE, AUTONOMOUS VEHICLE

(71) Applicant: AQUA PRODUCTS, INC., Cedar Grove, NJ (US)

(72) Inventors: William Londono Correa, Wayne, NJ (US); Ethan Hanan, Teaneck, NJ (US)

(73) Assignee: AQUA PRODUCTS, INC., Cedar Grove, NJ (US)

( * ) Notice: Subject to any disclaimer, the term of this patent is extended or adjusted under 35 U.S.C. 154(b) by 188 days.

(21) Appl. No.: 15/831,622

(22) Filed: Dec. 5, 2017

(65) Prior Publication Data

US 2018/0162467 A1    Jun. 14, 2018

Related U.S. Application Data

(60) Provisional application No. 62/431,578, filed on Dec. 8, 2016.

(51) Int. Cl.
| | | |
|---|---|---|
| *B62D 55/24* | (2006.01) | |
| *B63H 19/08* | (2006.01) | |
| *B62D 55/28* | (2006.01) | |
| *B60F 3/00* | (2006.01) | |
| *E04H 4/16* | (2006.01) | |

(52) U.S. Cl.
CPC .......... *B62D 55/244* (2013.01); *B60F 3/0015* (2013.01); *B62D 55/28* (2013.01); *B63H 19/08* (2013.01); *E04H 4/1654* (2013.01)

(58) Field of Classification Search
CPC .... B62D 55/244; B62D 55/28; E04H 4/1654; B60F 3/0015; B63H 19/08

USPC ........................................................ 305/180
See application file for complete search history.

(56) References Cited

U.S. PATENT DOCUMENTS

| | | | |
|---|---|---|---|
| 2,312,072 A * | 2/1943 | Tenger | B62D 55/20 |
| | | | 305/161 |
| 2,898,965 A | 8/1959 | Eddy | |
| 3,058,783 A | 10/1962 | Wadsworth et al. | |

(Continued)

FOREIGN PATENT DOCUMENTS

| | | |
|---|---|---|
| FR | 2731168 A1 | 9/1996 |
| WO | 2007061397 A1 | 5/2007 |

(Continued)

OTHER PUBLICATIONS

Notification of Transmittal of International Search Report and written Opinion including International Search Report and Written Opinion for PCT/US2018/063794 dated Mar. 1, 2019, 12 pages.

*Primary Examiner* — S. Joseph Morano
*Assistant Examiner* — Jean W Charleston
(74) *Attorney, Agent, or Firm* — Kilpatrick Townsend & Stockton LLP; Dean W. Russell

(57) ABSTRACT

An endless track belt for a submersible, autonomous vehicle is disclosed. The track belt includes an outer surface with raised track elements that are configured to both engage a supporting surface and selectively receive external grip elements configured to engage the supporting surface. The track belt also includes an inner surface with continuous, annular ridges. The continuous ridges are configured to secure the endless track belt to a drive pulley in a manner that prevents lateral movement while allowing for some longitudinal slip during rotational movement of the belt.

14 Claims, 6 Drawing Sheets

(56) References Cited

U.S. PATENT DOCUMENTS

| | | |
|---|---|---|
| 3,545,822 A | 12/1970 | Gremeret |
| 3,720,448 A | 3/1973 | Allen et al. |
| 4,380,135 A | 4/1983 | Wildman et al. |
| 4,390,214 A | 6/1983 | Gunter et al. |
| 4,477,998 A | 10/1984 | You |
| D302,017 S | 7/1989 | Grawey et al. |
| 5,507,058 A | 4/1996 | Minami et al. |
| 6,099,091 A | 8/2000 | Campbell |
| 6,155,657 A | 12/2000 | Erlich et al. |
| 6,212,725 B1 | 4/2001 | Porat |
| D473,245 S | 4/2003 | Heitmann |
| 6,540,310 B1* | 4/2003 | Cartwright ............ B62D 55/28 305/160 |
| 6,548,982 B1 | 4/2003 | Papanikolopoulos et al. |
| 6,782,578 B1 | 8/2004 | Rief et al. |
| D549,244 S | 8/2007 | Noel |
| 7,673,951 B2 | 3/2010 | Chiang |
| 7,723,934 B2 | 5/2010 | Adam et al. |
| 8,225,446 B2 | 7/2012 | Hui |
| 8,561,240 B2 | 10/2013 | Hui |
| 8,651,206 B2 | 2/2014 | Slawinski et al. |
| 8,661,594 B2 | 3/2014 | Hui et al. |
| 8,789,631 B2 | 7/2014 | Slawinski et al. |
| 9,010,465 B2 | 4/2015 | Slawinski et al. |
| 9,283,681 B2 | 3/2016 | Slawinski et al. |
| 9,399,877 B2 | 7/2016 | Erlich et al. |
| 9,688,326 B2 | 6/2017 | Xiao et al. |
| 9,758,202 B2 | 9/2017 | Nielsen et al. |
| 9,878,749 B2* | 1/2018 | Sugihara ............... B29C 33/12 |
| 2005/0104450 A1* | 5/2005 | Gagne ................... B62D 55/244 305/165 |
| 2006/0059637 A1 | 3/2006 | Fridman et al. |
| 2008/0136254 A1 | 6/2008 | Jacobsen |
| 2008/0211301 A1* | 9/2008 | Jee ....................... B62D 55/244 305/177 |
| 2010/0201187 A1 | 8/2010 | Jacobsen |
| 2013/0031730 A1* | 2/2013 | Hui ....................... E04H 4/1654 15/1.7 |
| 2014/0116316 A1 | 5/2014 | Fontaine |
| 2015/0101135 A1 | 4/2015 | Witelson et al. |
| 2015/0121636 A1 | 5/2015 | Hui et al. |
| 2016/0289988 A1 | 10/2016 | Maggeni et al. |
| 2016/0340922 A1 | 11/2016 | Erlich et al. |
| 2016/0362151 A1* | 12/2016 | Jee ......................... B62D 55/26 |
| 2017/0158268 A1* | 6/2017 | Tibbits ................. B62D 55/286 |
| 2017/0305484 A1* | 10/2017 | Chiang ................. B62D 55/26 |
| 2018/0015971 A1* | 1/2018 | Blackburn ............. B62D 55/24 |
| 2018/0071908 A1 | 3/2018 | Goldenberg et al. |
| 2018/0073265 A1 | 3/2018 | Goldenberg et al. |
| 2018/0073266 A1 | 3/2018 | Goldenberg et al. |
| 2018/0162467 A1 | 6/2018 | Correa et al. |

FOREIGN PATENT DOCUMENTS

| | | | |
|---|---|---|---|
| WO | 2016196169 A1 | 12/2016 | |
| WO | 2017093908 A1 | 6/2017 | |
| WO | WO-2017093908 A1 * | 6/2017 | ............ B62D 55/12 |

* cited by examiner

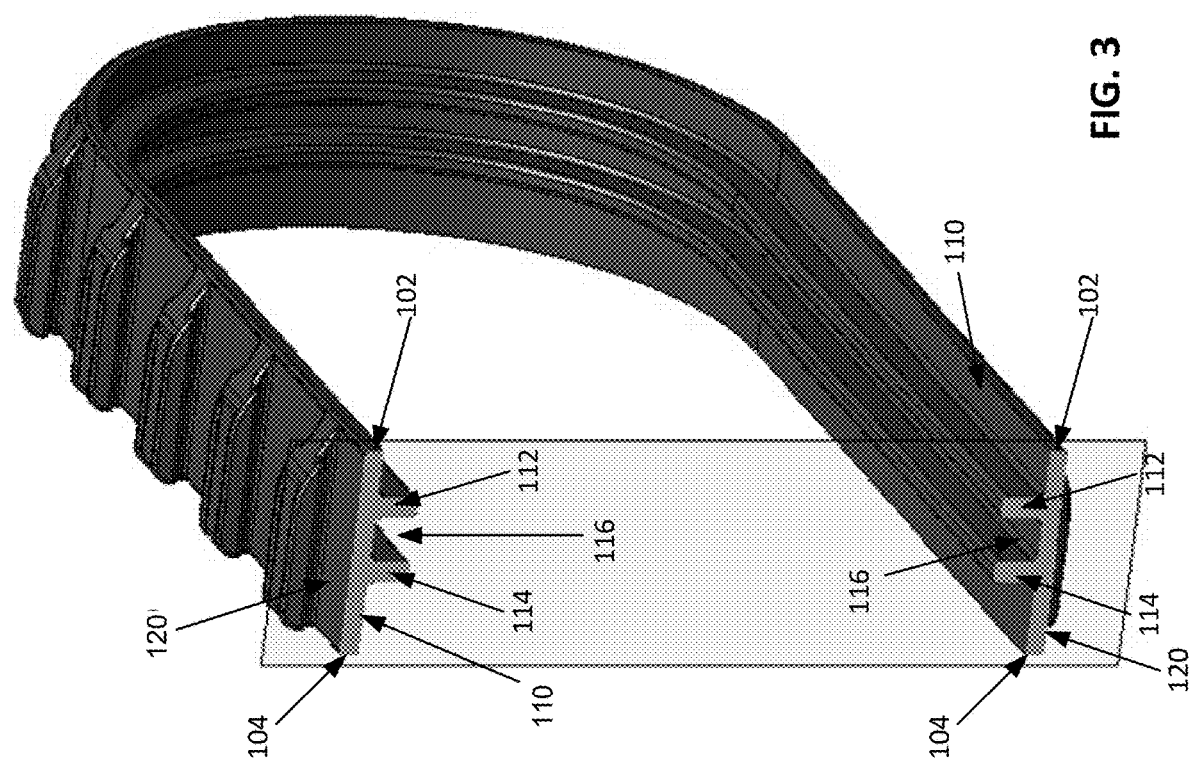

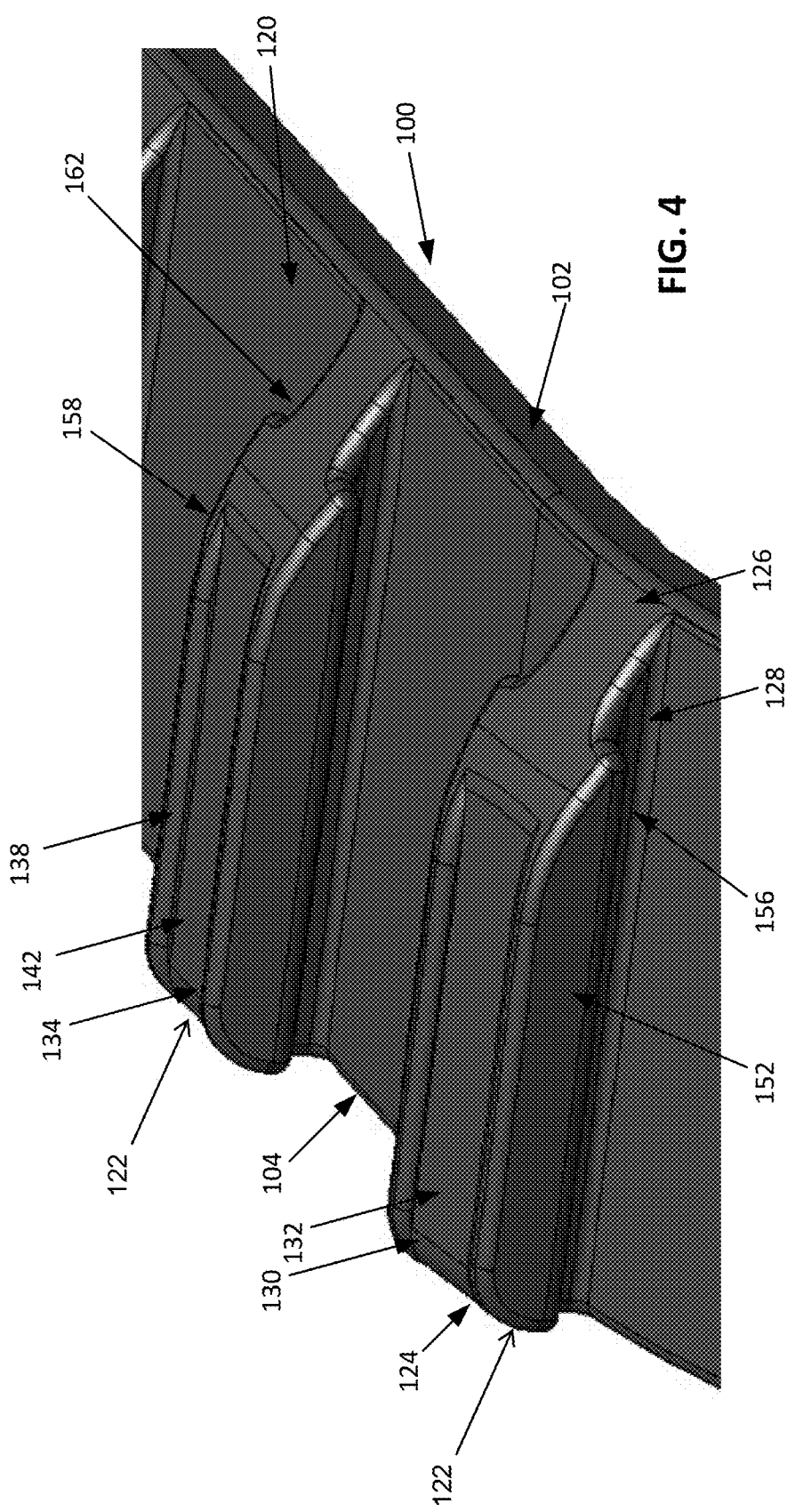

ENDLESS TRACK FOR SUBMERSIBLE, AUTONOMOUS VEHICLE

CROSS-REFERENCE TO RELATED APPLICATIONS

This application claims priority to and the benefit of U.S. Provisional Patent Application No. 62/431,578, filed Dec. 8, 2016, and entitled "Endless Track for Submersible, Autonomous Vehicles," the disclosure of which is incorporated herein by reference in its entirety.

FIELD OF INVENTION

The present invention relates to the field of autonomous vehicles and, in particular, to an endless track belt for a submersible, autonomous vehicle.

BACKGROUND

Autonomous vehicles are being introduced into an ever increasing number of facets of daily life in order to automate various tasks, such as cleaning a pool, cleaning an indoor space, and maintaining a lawn. Many of these autonomous vehicles and, in particular, submersible, autonomous vehicles, such as pool cleaners, utilize a propulsion element that is or includes an endless track/belt (also referred to as a tank tread, continuous track, or other such names) to drive or propel the autonomous vehicle along a supporting surface (e.g., the surface of a wall/floor of a pool).

Typically, an endless track belt operates by rotating around two rotating elements (e.g., drive wheels, gears, drive pulleys, etc.) disposed at opposite distal portions of the endless track. In order to engage these rotating elements, endless tracks often include internal teeth or other such spaced apart, internal elements. The teeth (or other such elements) engage and rotate about the rotating elements so that the rotating element can drive (e.g., rotate) the endless track belt. Binding and jamming may occur if the tracks on both sides of the autonomous vehicles are not perfectly synchronized for simultaneous rotation (or are too tightly coupled to the rotating elements). Such binding and jamming may impart unwanted forces to a motor driving the rotating elements, possibly causing the motor to overheat or otherwise malfunction. This issue has typically been solved by including gaps between the teeth (or other such elements) on the inside of the endless belt, which provide some play or looseness in the system.

Moreover, when endless tracks are used with submersible, autonomous vehicles, such as pool cleaners, the submersible, autonomous vehicles often experience gripping issues. For example, a submersible, autonomous vehicle may be unable to travel along angled surfaces of a pool, pool walls, and/or up and down stairs included in the pool. Unfortunately, often, a track cannot be modified or reconfigured to function adequately in different environments.

In view of at least the aforementioned issues, an endless track with continuous internal elements that engage drive pulleys while allowing for some slipping between the endless track and the drive pulleys is desirable. Moreover, an endless track that can be reconfigured or modified to allow a user to customize a track belt for different environments or surfaces is desirable.

SUMMARY

The present invention relates to an endless track belt for a submersible, autonomous vehicle. The track belt includes an internal surface with two continuous drive ridges (e.g., the drive ridges extend continuously, without any gaps or breaks, around the inner surface of the track belt) that are configured to ride around and frictionally engage a single raised boss included on an outer periphery of associated drive pulleys. This engagement allows for some slip (e.g., of the single raised bosses within the space between the track belt ridges) in the longitudinal direction, but maintains lateral (e.g., side-to-side) positioning of the track belt with respect to the pulleys. Consequently, the internal drive ridges substantially prevent binding while stably securing the track belt to drive pulleys.

The track belt also includes external raised track elements that help a host submersible, autonomous vehicle (e.g., the autonomous vehicle on which the track belt is installed or "hosted") traverse and grip a supporting surface (e.g., a surface of the walls or floor of a pool). The construction/geometry of these raised track elements also provides the track belt with a unique capability to be reconfigured or modified by and end-user. As is explained in further detail below, each of the external raised track elements may include a number of undercut sections or portions that form cavities or receptacles on or around the raised track element. These cavities allow an end-user to selectively insert or connect additional grip elements to the track belt, if desired. These grip elements may be made of a material that is different and more pliable (e.g., grippy or higher coefficient of friction) than the track belt itself. For example, the additional gripping elements could include or be a partially hollow elements, such as suction cups. Consequently, an end-user can customize the track/belt based upon the makeup and requirements of the specific surfaces of a particular operation environment of a submersible, autonomous vehicle (e.g., the particular pool that an autonomous pool cleaner will be cleaning).

The present invention avoids problems posed by known submersible, autonomous vehicles with endless tracks (e.g., binding and gripping issues) by providing an endless track that allows for at least some longitudinal slip with respect to drive pulleys and including features that allow additional grip elements to be selectively attached thereto. Consequently, a submersible, autonomous vehicle including the endless track presented herein may be suitable for a wide variety of environments (including a wide variety of pools). This may extend the lifespan of an autonomous vehicle and/or expand the breadth of tasks that the autonomous vehicle can complete. Consequently, the endless track may provide a cost savings to an end user (who may not need to acquire multiple submersible robots) while also solving technical issues typically associated with endless tracks. Additionally, by making the internal surface drive ridges continuous on the track belt, additional molding or manufacturing costs for creating gaps or breaks, around the inner surface of the track belt can be avoided.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures:

FIG. 3 is a perspective, sectional view of the endless track belt of FIG. 2B.

FIG. 4 is a perspective view of an outer surface of a section of the endless track belt of FIG. 2B, the section includes two raised track elements.

DETAILED DESCRIPTION

The following description is not to be taken in a limiting sense but is given solely for the purpose of describing the broad principles of the invention. Embodiments of the invention will be described by way of example, with reference to the above-mentioned drawings showing elements and results according to the present invention.

Generally, the endless track belt presented herein includes internal ridges and external, raised track elements. The internal ridges are configured to secure the endless track belt to a rotatable drive element (e.g., a pulley, gear, etc.) in a manner that prevents lateral movement (e.g., side-to-side movement), allows the rotatable drive element to impart rotational movement to the endless track, and also allows some longitudinal slip to prevent binding. Meanwhile, the external, raised track elements are configured to engage a supporting surface (e.g., a pool surface, such as a wall or floor) in a manner that grips the supporting surface. In at least some instances, the geometry of the raised track elements may allow the raised track elements to sufficiently grip a supporting surface. However, the geometry also allows additional grip elements to be installed on, secured around, or otherwise attached to the raised track elements in case additional grip is required.

Advantageously, the engagement between the endless track and any corresponding drive elements (e.g., a laterally secure engagement that allows for some longitudinal slip with respect to a drive pulley), may allow the endless track belt to be utilized with a wide variety of drive motors (including motors with or without a clutch). Meanwhile, the grip provided by the external, raised track elements (with or without additional grip elements installed therein) allows the endless track to function in a wide variety of environments, including pools of different shapes, sizes, and construction materials, as well as pools or other underwater environments with unique features of architectural elements. Consequently, the endless track of the present invention may be versatile and widely compatible with many submersible, autonomous vehicles while also rendering a host submersible, autonomous vehicle more versatile and widely compatible with different environments once installed thereon.

Figure 1:
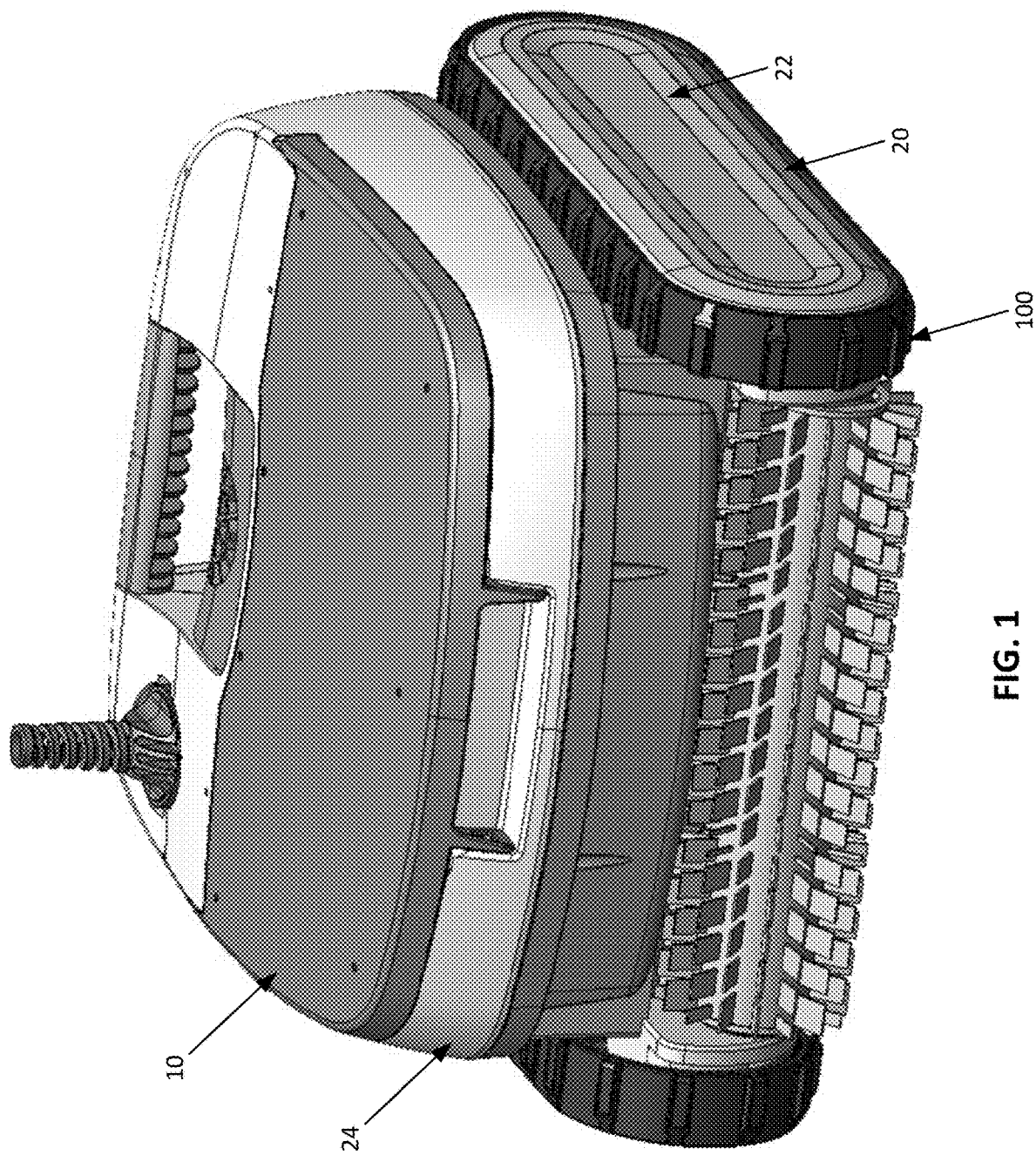
FIG. 1 is a side view of an example submersible, autonomous vehicle (e.g., a swimming pool cleaner) including at least one endless track belt configured in accordance with an exemplary embodiment of the present invention.

Now referring to FIG. 1 for a high-level description of a submersible, autonomous vehicle 10 including an exemplary endless track belt 100 in accordance with the present invention. In the depicted embodiment, the endless track belt 100 is installed on a side of the submersible, autonomous vehicle 10, around a wheel assembly 20 of the submersible, autonomous vehicle 10. More specifically, the wheel assembly 20 includes a housing or support 20 (positioned behind cover plate 22) configured to support two drive pulleys of the submersible, autonomous vehicle 10 (an exemplary drive pulley is shown and described below in connection with FIG. 2A) and the endless track belt 100 is installed around the drive pulleys.

In the particular embodiment shown in FIG. 1, the drive pulleys are operatively coupled to a drive motor disposed within a main body 24 of the submersible, autonomous vehicle 10 (e.g., via a gear train); however, in other embodiments, the drive pulleys may be driven in any desirable manner (e.g., via a motor included in the wheel assembly). Additionally or alternatively, the submersible, autonomous vehicle may not be driven/propelled by the endless track belt and may be driven by another additional drive system (e.g., a jet or fluid propulsion system). In these instances, the endless track belt may still provide enhanced external grip and a secure bond to the drive pulleys and/or enhance a supplemental drive system.

Figure 2B:
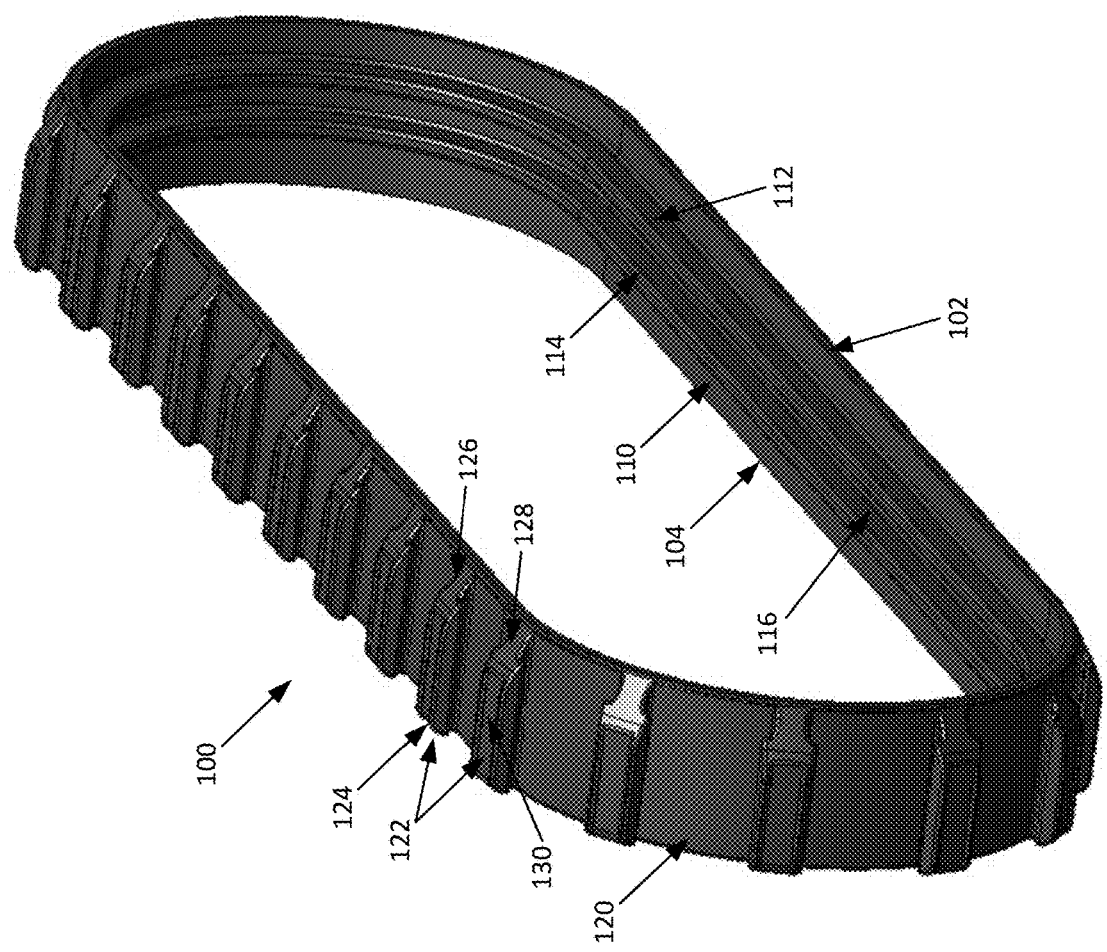
FIG. 2B is a side, perspective view of the endless track belt included in the submersible, autonomous swimming pool cleaner of FIG. 1.
Figure 2A:
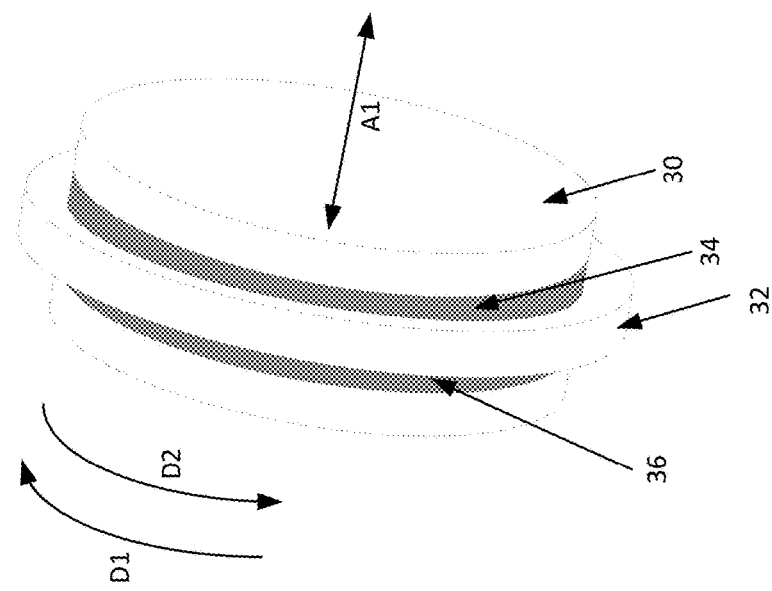
FIG. 2A is a side, perspective view of an example drive pulley included in a wheel assembly of the submersible, autonomous swimming pool cleaner of FIG. 1.

One exemplary drive pulley 30 is shown in FIG. 2A. The drive pulley includes a single raised external surface, boss 32, that is configured to rotate about a central axis (e.g., axis A1), like any standard pulley. The drive pulley 30 also includes two contact portions (identified as 34 and 36). As is explained below, contact portions 34 and 36 are simply flat portions of the surface of pulley 30 and are each configured to contact a drive ridge from the track belt 100. The single raised external boss 32 of the drive pulley 30, when received between the internal drive ridges of the drive belt, laterally secures the track belt 100 to the drive pulley 30 (e.g., prevents substantial movement of the ridges in either direction along axis A1). Contact portions 34 and 36 are also configured to impart rotation to the track belt 100 in direction D1 or D2, while allowing the track belt some freedom to slip during movement in these directions, as is explained further below.

Now referring to FIGS. 2B and 3, but with continued reference to FIG. 1, the exemplary track belt 100 includes an external surface 120 (also referred to as an outer surface) disposed opposite an internal surface 110 (also referred to as an inner surface). The external surface 120 and internal surface 110 are both substantially annular and extend between an inner edge 104 (e.g., an edge disposed adjacent the submersible, autonomous vehicle 10) and an outer edge 102.

The internal surface 110 includes a first drive ridge 112 and a second drive ridge 114. Drive ridge 112 and drive ridge 114 each extend continuously around the inner surface 110 and are continuously, laterally separated from each other by a constant amount of space 116. The space (e.g., a gap) 116 may be any size that allows the gap 116 to mate with the boss 32 included on the drive pulley 30, but is preferably constant to ensure that the ridges 112 and 114 can continually travel on either side of the raised boss 32 of the drive pulley 30. In other words, drive ridge 112 and drive ridge 114 are annular, parallel ridges extending continuously around the internal surface 110 of the track belt 100.

Moreover, ridge 112 and ridge 114 are each separated from lateral edges (e.g., inner edge 102 and outer edge 104) of the track belt 100. Consequently, the two raised ridges 112 and 114 appear to rise from the inner surface 110 (as opposed to the belt appearing to have a thickness equivalent to the height/extension of the ridges 112 and 114 and a gap formed therein). Moreover, due to the space between ridge 112 and 114 and the space between ridges 112 and 114 and the lateral edges of the belt 100, ridges 112 and 114 contact small areas 34 and 36 on the face of the drive pulley (as illustrated in the shaded area in FIG. 2A) to intentionally allow for longitudinal slipping of the drive belt (to help protect the motor from the binding of the belt). That is, ridge 112 and 114 only contact a portion of the lateral faces included on the drive pulley 30 (i.e., the annular portions of the drive pulley on either side of boss 32). The smaller contact areas achieved by the use of these discrete raised ridges 112 and 114 (as opposed to a single, wider contact area) helps to facilitate the intentional longitudinal slipping of the track belt 100.

Moreover, drive ridge 112 and drive ridge 114 each extend away from the internal surface 110 of the track belt 100 so that each drive ridge can substantially engage a corresponding contact portion 34 and 36 as well as raised boss 32 included on drive pulley 30 (see FIG. 2A). Preferably, ridges 112 and 114 extend perpendicularly away from the inner surface 110 at a constant amount (e.g., the ridges have a constant length); however, in some embodiments, the distance that the ridges 112 and 114 extend away from the inner surface 110 may vary at different portions of the inner surface 110. Regardless, ridge 112 and 114 may extend a distance away from the inner surface 110 so that ridge 112 and ridge 114 contact the drive pulley 30 while the inner surface 110 is spaced from the drive pulley 130 This decreases the friction between the track belt 100 and the drive pulley 130 (at least as compared to belts where the entire or nearly the entire inner surface contacts the drive pulley) to allow for some longitudinal slip.

Moreover, neither ridge 112 nor ridge 114 includes a gap therein (although the two ridges are separated by a gap). In other words, ridge 112 and ridge 114 do not include teeth, individual segments or portions, or other such features that are typically seen to prevent binding. That is, the ridges 112 are gapless and toothless. Instead, ridges 112 and 114 are smooth and continuous so that ridges 112 and 114 consistently engage a corresponding contact portion 34 and 36 as well as raised boss 32 or other such rotational element. This engagement may substantially prevent the drive belt 100 from shifting or moving laterally (along the direction of axis A1) during operation (e.g., rotation) of the endless track belt 100. Moreover, this engagement may allow drive pulley 30 to drive ridges 112 and 114 to impart rotational movement from the drive pulley 30 to the drive belt 100 while allowing at least some longitudinal slip (along the longitudinal direction of the drive belt 100), thereby preventing any binding.

Now referring to FIGS. 2B and 4, the external surface 120 includes raised track elements 122. The raised track elements 122 are disposed over the entirety of the outer surface 120, but spaced apart from each other. The dimensions of this spacing may determine the exact number of raised track elements 122 included on the outer surface 120 and, in different embodiments, different spacing may be included. Consequently, different embodiments may have any desirable number of raised track elements 122.

Figure 5:
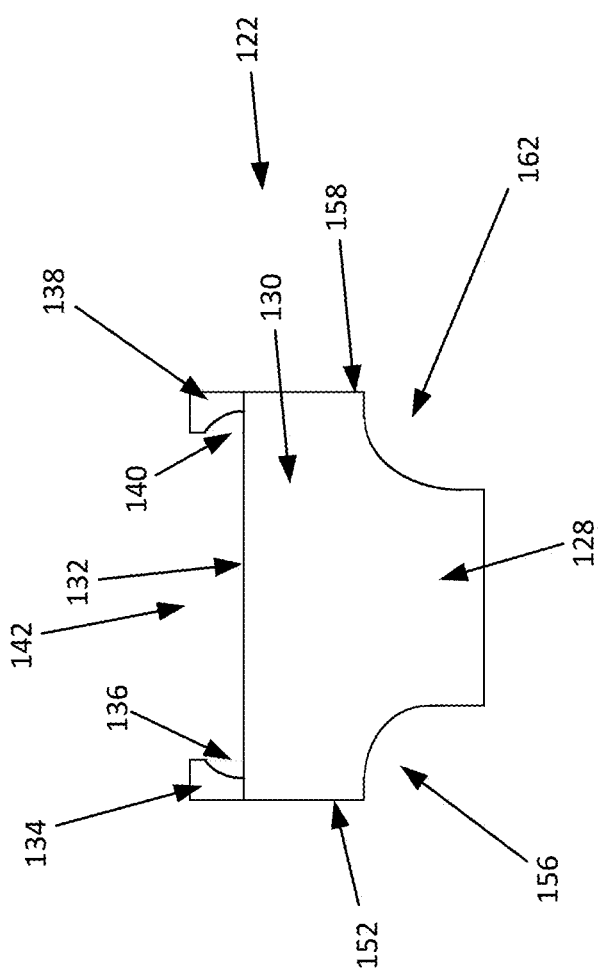
FIGS. 5 and 6 are side, sectional views of one of the raised track elements illustrated in the section of FIG. 4, with FIG. 6 illustrating the track element with an additional grip element installed therein.
Figure 6:
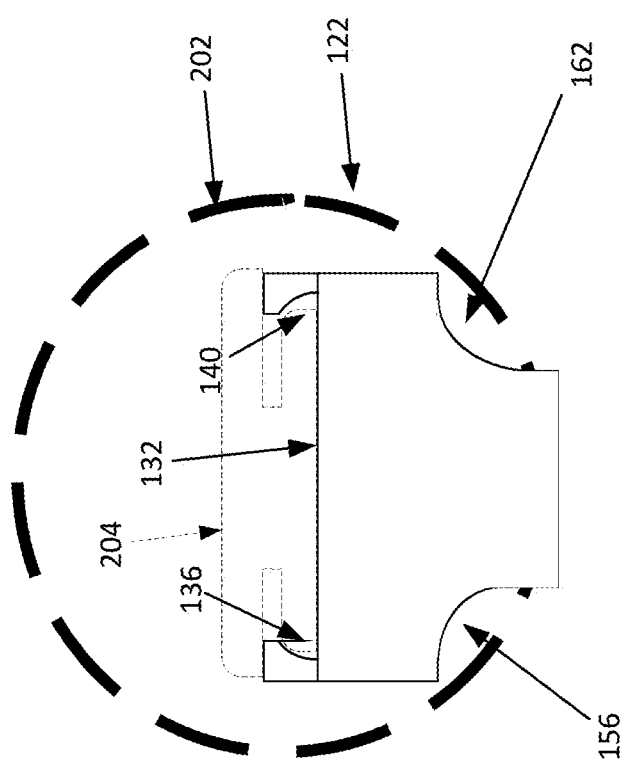

Regardless of how many raised track elements 122 are included, each track element 122 may include an inner edge 124 substantially adjacent to the inner edge 104 of the track belt 100 and an outer edge 126 substantially adjacent to the outer edge 102 of the track belt 100. In this particular embodiment, the inner edge 124 is rounded or chamfered and the outer edge 126 is sloped or slanted. These edge designs may be beneficial for gripping a supporting surface and/or for ensuring that the track 100 provides accurate steering; however, in other embodiments, the raised track elements 122 may include edges with any design or shape. Additionally, each track element 122 also includes a base 128 and an engagement portion 130, which are described in further detail below in connection with FIGS. 4-6. Notably, for simplicity, in FIG. 4 (as well as the other Figures), the features included on the track elements 122 may only be labelled on one track element but, in at least some embodiments, are to be understood to be included on each track element In FIG. 4, a section of the outer surface 120 of the track belt 100 including two raised track elements 122 is illustrated from a perspective view. One of these track elements 122 is shown in the sectional views provided by FIGS. 5 and 6. Collectively, FIGS. 4-6 illustrate the base 128 and engagement portion 130 of a raised track element 122. The base 128 supports the engagement portion 130 a distance above the outer surface 120. Meanwhile, the engagement portion 130 is configured to contact a supporting surface and includes a number of features configured to ensure the engagement portion 130 sufficiently grips the supporting surface, each of which are addressed in turn below.

First, a top surface 132 of the engagement portion 130 includes two peak edges that surround a valley portion 142: first peak edge 134 and second peak edge 138. Each of peak edge 134 and peak edge 138 overhangs the valley portion 142, much like the overhang of a roof, thereby creating a first receptacle 136 and a second receptacle 140 (as shown best in FIG. 5). Put another way, each of peak edge 134 and peak edge 138 includes an undercut portion that forms a receptacle. The undercut portion of peak edge 134 forms a receptacle 136 between the top surface 132 and the peak edge 134. Similarly, the undercut portion of peak edge 138 forms a receptacle 140 between the top surface 132 and the peak edge 138. As is shown in FIG. 6, these receptacles may allow a first external grip element 204 (shown in a first variant of dashed line) to be installed on and extending away from the top surface 132 of the engagement portion 130. For example, the external grip element 204 may be slid into engagement with receptacles 136 and 140. Additionally or alternatively, receptacle 136 and receptacle 140 may allow the peak edge 134 and peak edge 138, respectively, to bend (via the own resiliency and coefficient of friction) towards the top surface 132 when the peak edges are pressed against a supporting surface of a pool. This may allow a larger surface area of the engagement portion 130 to engage the supporting surface, thereby increasing the grip provided by the engagement portion 130.

Second, in at least some embodiments, the engagement portion 130 may overhang the base 128 to provide additional receptacles (in a similar manner to the peak edges). In particular, the engagement portion may include a first edge 152 (e.g., a leading edge when traveling in a first direction) and a second edge 158 (e.g., a trailing edge when traveling in the first direction). Each of these edges may extend beyond the base 128 to form cavity 156 and cavity 162, respectively. Similar to receptacles 136 and 140, the cavities may be configured to received an external grip element and/or allow the raised track element 122 to flex with respect to a support surface. More specifically, cavities 156 and 162 may allow the engagement portion 130 to flex with respect to the base 128 and may be configured to receive a second external grip element 202 (shown in a second variant of dashed line). As shown in FIG. 6, the external grip element 202 may extend substantially around the raised track element 122 and, thus (similar to grip element 204) may engage a supporting surface (e.g., resiliently engage) to increase the grip of the track belt 100 on the supporting surface.

In different embodiments and/or use cases, external grip elements (e.g., external grip elements 202 and 204) may be made of a material that is different and more or less pliable (i.e., grippy or having a different coefficient of friction) than the track belt 100. For example, the additional grip elements (e.g., grip elements 202 and 204) could have a partially hollow elements, such as suction cup surfaces, included thereon (or be a partially hollow elements, such as suction cups). Partially hollow elements, such as suction cups, or other additional grip elements may allow a submersible, autonomous vehicle (e.g., a pool cleaning robot) to grip tile, fiberglass, and other such materials with which a tread typically creates a low amount of friction. Regardless, since the track belt 100 (or more precisely, the raised track elements 122) includes features configured to receive external grip elements (e.g., cavities 156 and 162, as well as receptacles 136 and 140), the track belt 100 allows an end-user to customize the track belt 100 based upon the makeup and requirements of the specific surfaces (e.g., of a pool) to be traversed by a submersible, autonomous vehicle.

To summarize, in one form, an endless track belt for a submersible, autonomous vehicle is disclosed. The track belt includes an outer surface with raised track elements that are configured to both engage a supporting surface and receive external grip elements configured to engage the supporting surface. The track belt also includes an inner surface with continuous, annular ridges. The continuous ridges are configured to secure the endless track belt to a drive pulley in a manner that prevents lateral movement while allowing for some longitudinal slip during rotational movement of the belt.

In another form, an endless track belt for a submersible, autonomous is provided and comprises: an internal surface; and an external surface including a plurality of raised track elements that each define one or more cavities configured to removably receive an external grip element.

In yet another form, an endless track belt for a submersible, autonomous vehicle is provided and comprises: an inner surface with two or more continuous, annular ridges configured to secure the endless track belt to a drive pulley; and an outer surface with raised track elements that are configured to both engage a supporting surface and removably receive external grip elements configured to engage the supporting surface.

In still another form, an endless track belt for a submersible, autonomous vehicle is provided and comprises: an outer surface; and an inner surface with a pair of continuous, annular ridges configured to secure the endless track belt to a drive pulley in a manner that prevents lateral movement of the track belt on the drive pulley while allowing for some longitudinal slip of the track belt with respect to the drive pulley during rotational movement of the track belt.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the track belt described herein, or portions thereof may be fabricated from any suitable material or combination of materials, such as plastic, foamed plastic, wood, cardboard, pressed paper, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof. For example, the track belt of the present invention may preferably be formed from supple natural or synthetic materials such as polymers including, but not limited to rubber or other known elastomers, derivatives thereof, and combinations thereof.

Finally, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Similarly, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

What is claimed is:

1. An endless track belt for a submersible, autonomous vehicle, comprising:
    an internal surface; and
    an external surface including a plurality of raised track elements that each define (a) one or more receptacles configured to removably receive a first external grip element and (b) one or more cavities configured to removably receive a second external grip element.

2. The endless track belt of claim 1, wherein each of the raised track elements further comprises:
    a leading edge with a first undercut section that defines a first cavity of the one or more cavities; and
    a trailing edge with a second undercut section that defines a second cavity of the one or more cavities.

3. The endless track belt of claim 2, wherein each of the raised track elements further comprises:
    a base; and
    an engagement portion that overhangs the base at the leading edge and the trailing edge to define the first undercut section and the second undercut section.

4. The endless track belt of claim 2, wherein the first external grip element extends from the first undercut section, around the engagement portion, to the second undercut section.

5. The endless track belt of claim 1, wherein each of the raised track elements further comprises:
   an engagement portion with a top surface that defines a valley portion that at least partially defines the one or more receptacles.

6. The endless track belt of claim 5, wherein each of the raised track elements further comprises:
   a first peak edge extending along a leading edge of the valley portion, wherein the first peak edge overhangs the valley portion to define a first receptacle of the two or more receptacles between the valley portion and the first peak edge; and
   a second peak edge extending along a trailing edge of the valley portion, wherein the second peak edge overhangs the valley portion to define a second receptacle of the two or more receptacles between the valley portion and the second peak edge.

7. The endless track belt of claim 1, wherein the second external grip element comprises a partially hollow element.

8. The endless track belt of claim 1, wherein each of the raised track elements extends from an inner edge to an outer edge, the inner edge being rounded and the outer edge being slanted.

9. The endless track belt of claim 8, wherein the inner edge is substantially adjacent to an inner edge of the endless track belt and the outer edge is substantially adjacent to an outer edge of the endless track belt.

10. The endless track belt of claim 1, wherein the internal surface comprises:
    a pair of annular, parallel ridges that extend continuously around the internal surface and are configured to engage drive pulleys of the submersible, autonomous vehicle.

11. The endless track belt of claim 10, wherein the pair of ridges are gapless and toothless.

12. An endless track belt for a submersible, autonomous vehicle, comprising:
    a. an internal surface; and
    b. an external surface including at least one raised track element; and
    in which the at least one raised track element comprises means for removably connecting an external grip element to the external surface; and
    wherein (i) the external grip element is selected from a group of different external grip elements, (ii) the at least one track element comprises (A) a base and (B) an engagement portion supported by the base, (iii) the engagement portion comprises a top surface including (A) a valley portion and (B) at least one peak edge, and (iv) the means for removably connecting an external grip element comprises at least one receptacle created by the at least one peak edge overhanging the valley portion.

13. The endless track belt of claim 12, wherein (a) the valley portion of the top surface extends outward from the base and (b) the at least one peak edge extends outward from the valley portion of the top surface.

14. An endless track belt for a submersible, autonomous vehicle in the form of a swimming pool cleaner having a drive mechanism, the endless track belt comprising:
    a. an internal surface contacting in use the drive mechanism of the swimming pool cleaner; and
    b. an external surface opposite the internal surface and including at least one raised track element comprising means for removably connecting, to the external surface, an external grip element selected from a group of different external grip elements; and
    in which (i) the at least one raised track element comprises (A) a base and (B) an engagement portion supported by the base, the engagement portion comprises a top surface including a valley portion and a plurality of peak edges, and (ii) the means for removably connecting an external grip element comprises a plurality of receptacles created by the plurality of peak edges overhanging the valley portion.

\* \* \* \* \*